United States Patent [19]

Roose

[11] Patent Number: 5,437,831
[45] Date of Patent: Aug. 1, 1995

[54] PROCESS OF MODIFYING A CABLE END

[75] Inventor: Lars D. Roose, Albuquerque, N. Mex.

[73] Assignee: The United States of America as represented by the United States Department of Energy, Washington, D.C.

[21] Appl. No.: 102,184

[22] Filed: Aug. 4, 1993

[51] Int. Cl.[6] .................. B29C 33/10; B29C 67/00
[52] U.S. Cl. .................................................. 264/322
[58] Field of Search .................. 264/322, 345, 348

[56] References Cited

U.S. PATENT DOCUMENTS 5,213,750 5/1993 Knapp et al. .................. 264/322 X

FOREIGN PATENT DOCUMENTS 43-5069 2/1968 Japan .................................. 264/322

OTHER PUBLICATIONS

G. L. Ragan, *Microwave Transmission Circuits*, McGraw-Hill Book Company, Inc., 1948, p. 260.

*Primary Examiner*—Leo B. Tentoni
*Attorney, Agent, or Firm*—Russell D. Elliott; James H. Chafin; William R. Moser

[57] ABSTRACT

End moldings for high-voltage cables are described wherein the dielectric insulator of the cable is heated and molded to conform to a desired shape. As a consequence, high quality substantially bubble-free cable connectors suitable for mating to premanufactured fittings are made. Disclosed are a method for making the cable connectors either in the field or in a factory, molds suitable for use with the method, and the molded cable connectors, themselves.

11 Claims, 4 Drawing Sheets

PROCESS OF MODIFYING A CABLE END

GOVERNMENT RIGHTS

The United States Government has rights in this invention pursuant to Contract No. DE-AC04-76DP00789 between the U.S. Department of Energy (DOE) and AT&T Technologies, Inc. (Sandia).

BACKGROUND OF THE INVENTION

1. Field of Invention

This invention relates generally to the fabrication of high-frequency (or pulsed), high-voltage connectors and, more particularly, to modification of coaxial cable ends to serve as connectors to unite cables with electrical fittings. Disclosed are a method for making the connectors, molds for use with the method, and the connectors, themselves.

2. Description of the Related Art

In a field of high-voltage connectors, it is frequently necessary to adjoin coaxial cables consisting of a central electrical conductor surrounded by a nonconducting or poorly conducting dielectric and an outer conductor which surrounds the dielectric. Ordinarily, the dielectric permits the conducting core of the cable to be insulated electrically from the electric potential of the outer conductor. In high-voltage environments, including in applications involving pulse power, there is a significant risk that when two conductors of opposite respective polarities are placed in sufficiently close proximity to each other, electromagnetic breakdown will occur in the air or other insulating dielectric medium between the conductors resulting in a spark or electromagnetic arc, thus allowing the difference in potential to be neutralized. Thermoplastics, such as high-density polyethylene (HDPE) are common and effective dielectrics for uses associated with high-voltage pulsed power.

One purpose of the dielectric insulator surrounding the conductor material is to provide insulation capable of preventing sparking or arcing. Another purpose is to furnish proper characteristics of impedance determined by the specific composition of the dielectric material, its inner diameter and its outer diameter. Relationships between impedance, dielectric constants and the dimensions (including thickness) of particular dielectrics are well known to those skilled in the art of high voltage connections. It is sufficient to mention here only that it is important to maintain the integrity of the characteristic coaxial impedance of high-voltage cable when splicing cable pieces together or joining cables to fixtures.

The insulating effectiveness of cable dielectric can be seriously compromised where cables are joined to one another or to components. This is due, in part, to the fact that, typically, such connections are not airtight, and gas-filled discontinuities in cable dielectric provide favorable conditions for arcing. This is due to the propensity of air, or other gases, in the presence of high voltages, to break down and allow discharge to occur.

Another concern related to arcing may involve gas bubbles in the dielectric of high-voltage cable. The presence of bubbles in the cable dielectric can increase the risk of an arc, much in the same way that a continuous air path across a junction can provide conditions for a spark, although to a lesser extent. In high-voltage applications, it is critical that gas bubbles or other discontinuities in the dielectric insulation be minimized or eliminated. Effective methods for fabricating safe connectors, therefore, cannot permit the continuity and integrity of the cable dielectric to be compromised.

The most commonly used approach to avoid arcing in proximity to high-voltage with a "socket" bearing an opposite configuration. The taper provides for a relatively longer distance, between the central metal conductor and the region outside of the dielectric insulator than a connection where an untapered cable end abuts another untapered cable or fitting. This increased distance relative, for example, to the distance of the radius of the dielectric, allows for a decreased likelihood of discharge due to breakdown of the medium filling the space between the two cable dielectrics. This tapering method has been demonstrated to be an effective connecting technique, as the path length in air between the dielectric surfaces is effectively lengthened. George L. Ragan, *Microwave Transmission Circuits*, McGraw-Hill Book Company, Inc., 1948, p. 260.

Fabrication of the tapered end is typically accomplished by cutting away the dielectric cable housing using a tool similar to a large pencil sharpener. Although this method has long been an accepted and preferred technique, certain drawbacks exist. For example, the sharpening technique can cause tearing of the dielectric in the region where it adjoins the inner conducting cable, thereby potentially causing gas pockets between the conductor and the dielectric in a location where the electric field is highly concentrated. Also, the sharpening method commonly used often results in a slightly oval cut, which is especially noticeable at the large end of the taper. This can cause difficulty later in securely fastening the tapered end of the dielectric cable into the receptacle of a fitting. Furthermore, it can potentially cause gas pockets to occur between the dielectric of the fitting and that of the connector, thereby increasing the risk of electromagnetic breakdown.

A different approach to minimizing arcing risk in high-voltage connections is to encase the connections in high-pressure gas-filled containers. This disclosure is primarily concerned with dielectrics such as HDPE and other thermoplastics, however, it is instructive to mention also that gases such as nitrogen, given favorable condition of pressure and temperature, can act as efficient dielectric insulators. In high-pressure, high-voltage connections, the high gas pressure in the region of the cable juncture increases gas density in the location of the cable dielectric discontinuity, and the effective amount of gas which would have to undergo electromagnetic breakdown in order for a spark to occur is increased.

In either case, it is necessary and desirable to be able to modify cable ends for high-voltage connections so that they can satisfactorily be mated to fittings used for adjoining the cables to other cables or to fixtures. This includes having the capability to make coaxial cable dielectrics conform to particular shapes favorable for use as cable connectors. Disclosed here is a new method for fabricating cable connectors capable of minimizing the risk of arcing in high-voltage, and in some cases high-pressure, environments. Also disclosed are molds used in the method, and connectors fabricated using the invention method.

BRIEF SUMMARY OF THE INVENTION

The needs noted above are met by the method and apparatuses of the invention wherein the electrical cable ends are modified, and connectors are manufactured, by heating the dielectric insulating medium surrounding the center conductor in a cable sufficiently to soften the dielectric, and then pressing it into a mold such that the dielectric medium is shaped into a desired configuration conforming to the shape of the mold.

Accordingly, it is an object of the present invention to provide a method for fabricating an electrical cable conductor comprising the steps of heating the end of a cable, sufficiently to soften the dielectric insulator surrounding the conducting core of the cable, and pressing the heated cable into a mold such that a portion of the conducting core of the cable passes through a central orifice in the mold, and thereby shaping the malleable dielectric medium into a desired configuration.

It is another object of the present invention to provide a means to vent gas trapped inside the mold or gas bubbles squeezed out of the softened dielectric medium as it is pressed into the mold.

It is yet another object of the present invention to provide electrical cable connectors manufactured using the described method.

It is yet another object of the present invention to provide molds which may be used in conjunction with the method of the invention.

Upon further study of the specification and appended claims, further objects and advantages will become apparent to those skilled in the art.

These objects have been obtained by providing the method and apparatuses of the present invention.

BRIEF DESCRIPTION OF THE DRAWING(S)

DETAILED DESCRIPTION OF THE INVENTION

Figure 1:
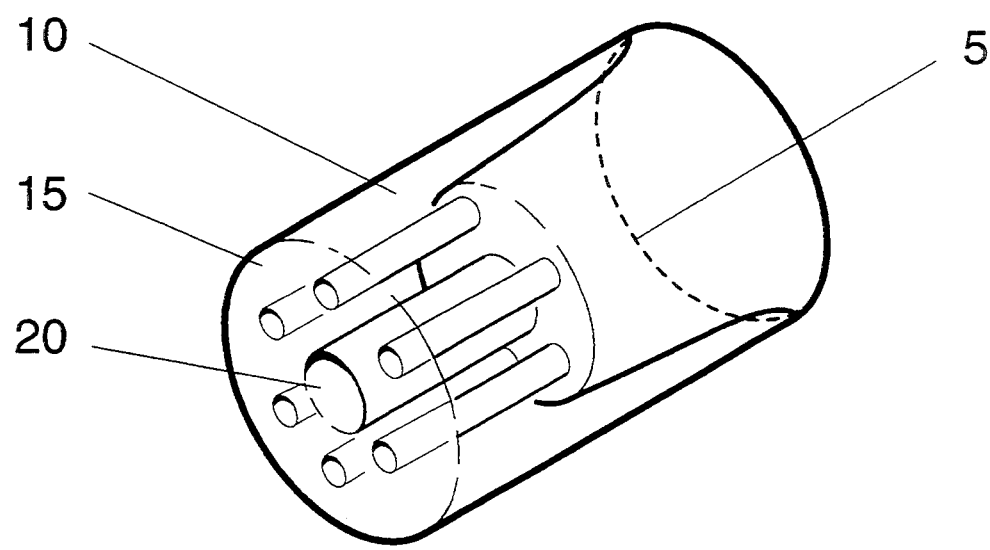
FIG. 1 depicts one configuration of a mold used in the method of the invention.

Users of high-voltage cables often require the capability to mate such cables to other cables or to fixtures utilizing premanufactured fittings made from TEFLON TM (tetrafluoroethylene Fluorocarbon polymer) or some other substance. Typically, the fittings receive the cable ends directly according to methods well known in the art of electrical connections and whereby a fitting comprises the female end of a connection and a cable comprises the male end of the connection. An example of such a connection is where in-line cables are spliced using a turnbuckle or other fitting. The nature of the art gives rise to the need to adapt the end of a high-voltage cable so that it might appropriately adjoin the fitting giving a satisfactory electrical union. Such a union must, according to the circumstances of use, maintain impedance integrity and exhibit an acceptably low risk of generating a short or permitting an arc to occur across the break in cable insulation continuity which results from adjoining the cable to either another cable or to a fixture via the fitting.

Oftentimes, connections between cables and fittings must be made by personnel in the field who require the capability to cut cable to a desired length and then conveniently to mate the cable to a particular fitting. The present invention provides a method for making appropriate modifications to cable ends thereby rendering them suitable for adjoining to fittings. The invention also provides novel molds for use with the method, and finally, provides the modified cable ends (connectors), themselves. Although, the invention is well-suited for field applications, the principals disclosed herein may be used in factory applications, as well.

The invention concerns making modifications to coaxial cable comprised of a central electrical conductor or wire surrounded by a dielectric insulator made of a material capable of being rendered malleable or soft with the application of heat. Thermoplastics are frequently used as dielectric insulators in coaxial cable, and one of the most common coaxial cable insulators is high-density polyethylene (HDPE). External to the dielectric insulator is a second conductor which typically takes the form of a wire mesh forming a tube surrounding the dielectric portion of the cable. Finally, the external mesh conductor is frequently encased in a "jacket" of rubber, plastic or some other material capable of providing insulation and protection against weathering.

According to the preferred embodiment, the outer casing and external mesh conductor are peeled back to reveal the outer surface of the dielectric insulator of a cable to be modified according to the method if this invention. In addition, a small portion of the dielectric insulator may be cut away from the central electrical conductor yielding easy, unobstructed access to the conductor.

Next, the revealed portion of the cable dielectric is heated uniformly, for example, using a heat gun, until the dielectric is softened and malleable. For HDPE, the dielectric should be heated until it appears relatively clear. The cable with softened dielectric is then pressed into a mold and the dielectric is thereby shaped into a desired configuration. The mold may be made of metal, ceramic or some other material capable of withstanding the temperatures and pressures characterizing the method of the invention. In the case of an aluminum mold, improved results have been demonstrated where the mold is likewise heated prior to the pressing step.

As will be discussed more fully below, it is desirable for the mold to have a centrally positioned opening through which a portion of the center conductor of the cable may be allowed to pass during the pressing stage. This serves as a guide to ensure satisfactory alignment of the dielectric in the mold with respect to the center conductor, and it allows the center conductor to protrude from the molded portion of the dielectric.

Finally, after the dielectric has cooled and set, the mold is removed, leaving a molded cable connector bearing a desired shape suitable for adjoining to a selected premanufactured fitting.

Shown in FIG. 1, from an oblique angle, is a mold suitable for practicing the invention. The mold is generally cylindrical in configuration and is capable of receiving and shaping the end of a cable according to the method of this invention. The mold illustrated in FIG. 1 is characterized by an inlet (5), leading to a molding receptacle 10), which ends in a terminus. In the case of the illustration, the terminus takes the form of a terminal wall (15), however, in other embodiments, the actual shape of the terminus will be dictated by the desired shape of the mold. In the center of the terminus is an orifice (20).

According to the method of the invention, the cable dielectric, exposed and heated to malleability as described above, is pressed into the mold via the inlet (5). The softened dielectric then fills the receptacle (10), conforms to the shape of the receptacle, and is allowed to cool. During the pressing process, the center conductor is pushed through the orifice (20) so that a portion of the conductor extends beyond the mold.

Figure 2:
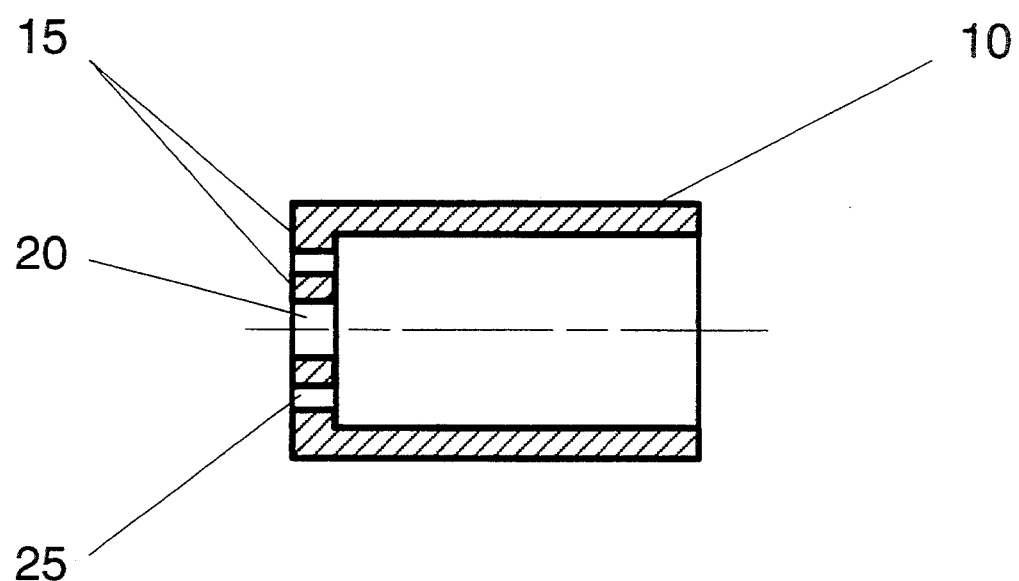
FIG. 2 depicts a mold with gas vents used in the method of the invention.

FIG. 2 illustrates a cross-section of an alternate mold construction containing vents. It has been observed that gas bubbles (typically air) may occur or develop in the dielectric medium either as a result of the original dielectric manufacturing processes, or due to the heating and pressing activities described in this disclosure, or simply due to the presence of gas in the mold prior to its being filled with malleable dielectric. Gas bubbles in the dielectric compromise the continuity of the dielectric insulator, and as such, pose an increased risk of arcing across the dielectric. These gas bubbles can be forced out of the heated dielectric medium as a consequence of the pressure exerted on the heated dielectric in the mold. Therefore, there is a benefit in providing vents in the mold through which gas forced out of the dielectric medium, or occupying the space in the receptacle, may be allowed to exit.

According to the arrangement in FIG. 2, the central orifice (20) is again located in the center of a terminal wall (15). Also in the terminal wall are several holes or vents (25) which provide openings between the inside of the receptacle (10) and the outside of the mold. In the preferred embodiment of this mold configuration, there is at least one such vent capable of providing passage through which gas may pass out of the mold as the malleable dielectric is compressed in the receptacle. The optimum number of vents are a matter of routine experimentation, and will depend on the size of the mold and the conditions under which it is used.

Figure 3:
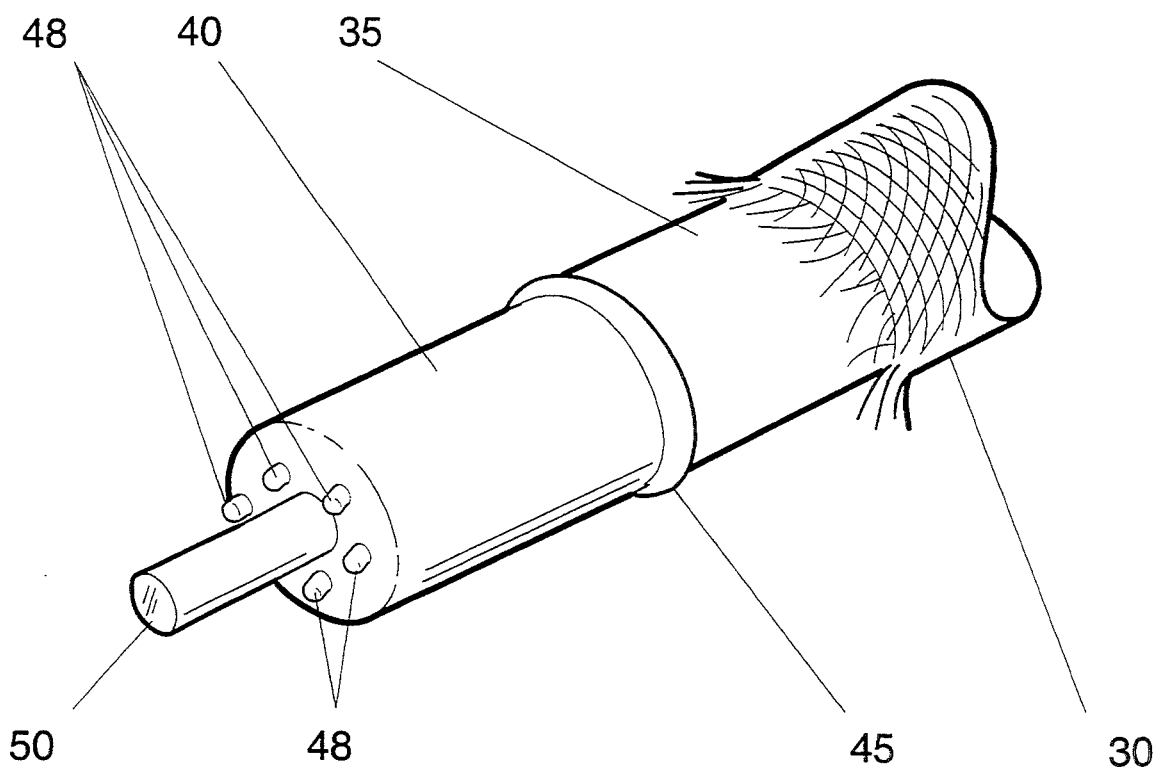
FIG. 3 depicts the appearance of a cable after the end has been molded using the method of the invention.

FIG. 3 illustrates, from an oblique angle, the appearance of a cable after it has been modified using the method of this invention. In particular, the cable shown in the Figure depicts an end molding which has been fashioned using a vented mold similar to that shown in FIG. 2. As illustrated, the outer braid conductor (30) of a coaxial cable has been pulled back to reveal the dielectric insulator (35) of the cable. The insulator has been heated, and the cable has been pressed into a vented mold, allowed to cool and removed from the mold, all according to the method of the invention described herein. The illustrated untapered end molding might be suitable, for example, for use with an encased high-pressure fitting such as was mentioned previously.

It is important to note that HDPE, for example, expands when heated and contracts when cooled. Accordingly, the mold should have inner dimensions slightly larger than the exact dimensions required for the cable end molding. Also, it is necessary for the mold receptacle to be designed so that the end molding that results will have proper dimensions in order to mate satisfactorily with a desired fitting.

The resulting end molding shown in FIG. 3 is characterized by a molded portion of the thermoplastic dielectric (40) which conforms to the dimensions of the receptacle of the mold used. A small amount if dielectric material is extruded in the course of the pressing step and results in the band of excess plastic (45) shown in the Figure. This can later be carefully removed with a knife, if desired or necessary. In the course of the pressing step, the extrusion of excess softened dielectric material from behind the inlet of the mold is an indication that the softened dielectric has been compressed sufficiently to fill and attain the shape of the receptacle. Additional excess plastic (48) is shown in FIG. 3 to have been extruded from vent holes in the mold, optimally, after gas has escaped through the vents. This plastic can, likewise, be cut away, as needed. Finally, the Figure shows where the conducting core (50) of the coaxial cable protrudes from the portion of the dielectric medium which has been molded using the method of the invention.

Figure 4A:
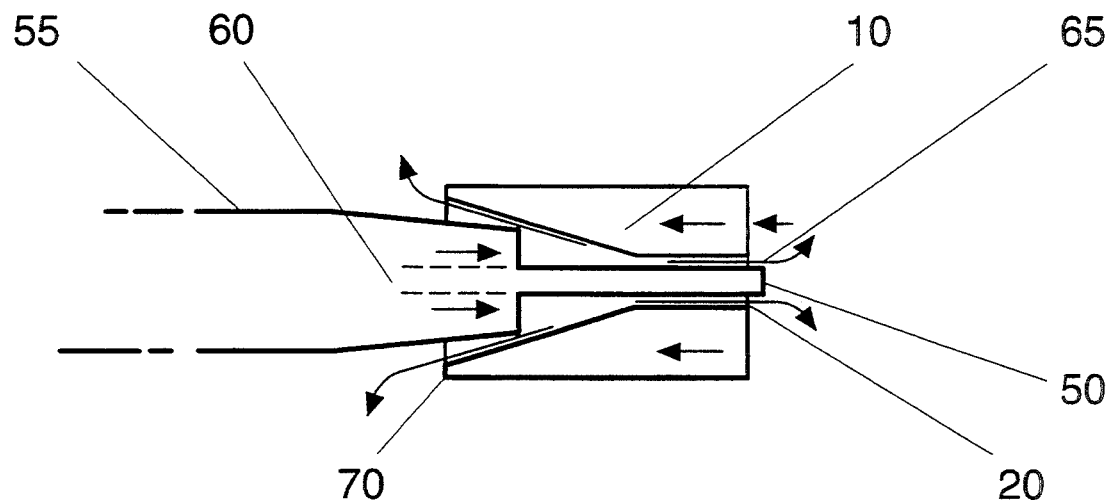
FIG. 4a depicts a mold with cable therein and showing alternate venting method.

FIG. 4a depicts the cross section of an alternate mold configuration which can be used to generate a cone-shaped cable end molding. Also shown in the Figure is the positioning of a cable inside the mold prior to the pressing step. In the arrangement in FIG. 4a venting of gas is by a means different from that already described. In this case, rather than providing additional holes in the mold to allow gas to escape, the shapes of the mold receptacle and the pre-trimmed dielectric provide passages through which gas can escape during the pressing step.

As illustrated, the mold receptacle (10') bears a roughly conical shape and the terminus of the mold does not take the form of a terminal wall, although the central orifice (20') is present. The conducting core (50) of the cable passes through the central orifice (20') as described previously. Of particular importance, however, is the fact that there is sufficient space between the outside perimeter of the cable core (50) and the outside perimeter of the orifice (20') to create a gap through which gas may be allowed to pass.

Figure 4B:
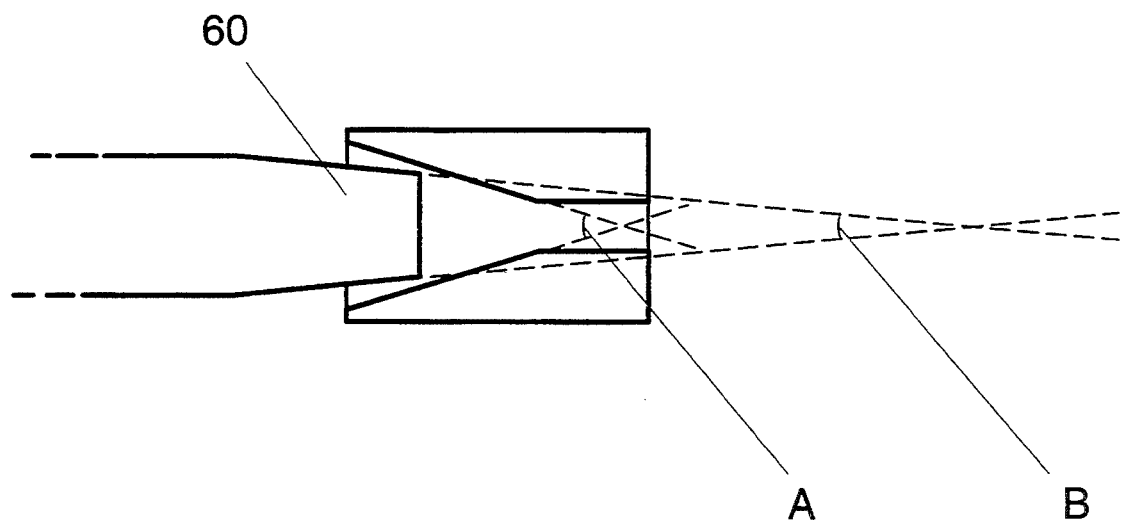
FIG. 4b depicts the mold and cable of FIG. 4a, but further illustrates particular angles which affect the operation of the alternate venting method.

As further illustrated in FIG. 4a, the cable dielectric has been trimmed in order to give it a roughly conical shape, as well. This trimming may be accomplished using the "giant pencil sharpener" described in the background section of this disclosure, or by other appropriate means known to skilled practitioners of the art. As depicted in the Figure, the cable dielectric, therefore, is comprised of an untrimmed portion (55) and a trimmed portion (60). The Figure further illustrates that, in this particular embodiment, the conical shape of the dielectric is truncated. Also, as further elaborated pictorially in FIG. 4b, the vertex angle (A) of the roughly conical configuration of the mold receptacle (10') is greater than the vertex angle (B) of the roughly conical configuration of the trimmed portion (60) of the dielectric.

The difference in vertex angles of the roughly conical configurations of the trimmed portion of the dielectric and the mold receptacle results in an effect whereby gas is vented from the mold both in a forward direction (65) and a rearward direction (70) with respect to the cut end of the cable as the cable and mold are pressed together. More specifically, the forward venting is through an opening created between the perimeter of the central orifice and the perimeter of the central conductor as the conductor passes through the orifice; the rearward venting is through the opening created between the perimeter of the mold inlet and the outside perimeter or boundary of the dielectric. Different degrees of venting can be achieved depending on the shape or position of the truncation.

The foregoing description of the invention has been presented for purposes of illustration. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated, as long as the principles described herein are followed. Thus, changes can be made in the above-described invention without departing from the spirit and scope thereof. It is also intended that the scope of the invention be defined by the claims appended hereto. The invention is intended to encompass all such variations as fall within its spirit and scope.

I claim:

1. A method for modifying an electrical cable end comprising the steps of:
    heating the end of a cable, comprising a conducting core surrounded by a dielectric insulating medium capable of being softened by the application of heat and having an end, sufficiently to render said dielectric insulating medium malleable,
    pressing said heated cable via an inlet into a mold comprising an inlet, a terminus bearing a central orifice, and a receptacle positioned between said inlet and said terminus, pressing such that a portion of said conducting core passes through said central orifice and said malleable dielectric medium is shaped into a desired configuration conforming to the shape of said receptacle,
    cooling said cable, and
    removing said cable from said mold.

2. The method of claim 1 further comprising squeezing trapped gas bubbles out of said malleable dielectric medium in the course of said pressing step.

3. The method of claim 2 wherein said mold further comprises a venting means through which said gas bubbles squeezed out of said malleable dielectric medium can pass outside of said mold.

4. The method of claim 3 wherein said terminus comprises a terminal wall.

5. The method of claim 4 wherein said venting means comprises at least one orifice in addition to said central orifice located in said terminal wall of said receptacle.

6. The method of claim 3 wherein said venting means comprises an opening created between the perimeter of said central orifice and the perimeter of said portion of said conducting core as it passes through said orifice.

7. The method of claim 6 wherein said venting means further comprises an opening created between the perimeter of said inlet and the perimeter of said malleable dielectric medium.

8. The method of claim 7 wherein said receptacle bears a generally conical configuration.

9. The method of claim 8 wherein said dielectric insulating medium in the region of the cable end bears a truncated generally conical configuration of which the vertex angle is less than that of the generally conical configuration borne by the receptacle.

10. The method of claim 5 or of claim 9 wherein said dielectric insulating medium is thermoplastic.

11. The method of claim 5 or of claim 9 wherein said dielectric insulating medium is high-density polyethylene.

* * * * *